(12) United States Patent
Holloway

(10) Patent No.: US 8,771,450 B2
(45) Date of Patent: Jul. 8, 2014

(54) METHOD FOR MANUFACTURING A COMPOSITE BODY AND A COMPOSITE BODY MANUFACTURING ARRANGEMENT

(75) Inventor: Gary Holloway, Cowes (GB)

(73) Assignee: Vestas Wind Systems A/S, Aarhus N. (DK)

(*) Notice: Subject to any disclaimer, the term of this patent is extended or adjusted under 35 U.S.C. 154(b) by 486 days.

(21) Appl. No.: 12/907,424

(22) Filed: Oct. 19, 2010

(65) Prior Publication Data

US 2011/0091684 A1  Apr. 21, 2011

Related U.S. Application Data

(60) Provisional application No. 61/253,246, filed on Oct. 20, 2009.

(30) Foreign Application Priority Data

Oct. 20, 2009  (DK) ................................ 2009 70164

(51) Int. Cl.
*D04H 3/08*  (2006.01)

(52) U.S. Cl.
USPC .......................................... 156/180; 156/574

(58) Field of Classification Search
USPC .......... 156/173, 174, 523, 574, 577, 180, 181
See application file for complete search history.

(56) References Cited

U.S. PATENT DOCUMENTS

| 4,167,429 | A | * | 9/1979 | Ackley | ........................... | 156/174 |
| 5,045,147 | A | * | 9/1991 | Benson et al. | ................ | 156/429 |
| 5,540,126 | A | * | 7/1996 | Piramoon | .......................... | 83/34 |
| 6,500,370 | B1 | * | 12/2002 | Belvin et al. | ..................... | 264/85 |
| 6,692,681 | B1 | | 2/2004 | Lunde | | |
| 7,137,182 | B2 | * | 11/2006 | Nelson | .............................. | 29/428 |
| 2002/0028332 | A1 | * | 3/2002 | Pratt | .............................. | 428/364 |

(Continued)

FOREIGN PATENT DOCUMENTS

| DE | 33 31 494 | 3/1985 |
| WO | 2005/005641 | 1/2005 |
| WO | 2009/077581 | 6/2009 |
| WO | 2009/077582 | 6/2009 |

OTHER PUBLICATIONS

Dmitri Burdykin; 1st Technical Examination issued in Denmark priority Application No. PA 2009 70164; Jun. 3, 2010; 8 pages; Denmark Patent and Trademark Office.

(Continued)

*Primary Examiner* — John Goff
*Assistant Examiner* — Scott W Dodds
(74) *Attorney, Agent, or Firm* — Wood, Herron & Evans, LLP

(57) ABSTRACT

A method of forming a composite body using a mould and an automated fiber placement machine comprising a fiber placement head, the method including moving the fiber placement head past the mould and depositing on the mould a plurality of fiber tows, the fiber tows being deposited side by side in a direction perpendicular to the movement of the fiber placement head and perpendicular to the direction of a normal of a surface of the mould where the fiber tows are deposited, thus forming a ply with a plurality of fiber tows placed side by side on the mould, wherein the fiber tows in the ply comprise first and second fiber tows having respective first and second fiber materials that are different from each other.

7 Claims, 4 Drawing Sheets

(56) References Cited

U.S. PATENT DOCUMENTS

2005/0039843 A1* 2/2005 Johnson et al. ............... 156/175
2006/0073309 A1 4/2006 Hogg
2007/0029030 A1* 2/2007 McCowin .................... 156/173
2007/0044896 A1 3/2007 Tingley
2008/0246175 A1* 10/2008 Biornstad et al. ............. 264/109
2009/0258220 A1 10/2009 Schaaf et al.
2009/0317585 A1* 12/2009 Bech ............................ 428/113

OTHER PUBLICATIONS

Monica Lozza; European Search Report issued in European Application No. 10178614.3; Feb. 9, 2011; 5 pages; European Patent Office.

* cited by examiner

METHOD FOR MANUFACTURING A COMPOSITE BODY AND A COMPOSITE BODY MANUFACTURING ARRANGEMENT

CROSS-REFERENCE TO RELATED APPLICATIONS

This application claims priority under 35 U.S.C. §119(a) to DK Application No. PA 2009 70164, filed Oct. 20, 2009. This application also claims the benefit of U.S. Provisional Application No. 61/253,246, filed Oct. 20, 2009. Each of these applications is incorporated by reference herein in its entirety.

TECHNICAL FIELD

The invention relates to a method of forming a composite body using a mould and an automated fiber placement machine, and to a composite body manufacturing arrangement comprising a mould and a fiber placement machine.

BACKGROUND

A general trend in wind power technology is increasing sizes of wind turbines. As a result of this, and the increased number of turbines manufactured, there is a desire to make manufacturing processes more effective and faster. In particular wind turbine blades, normally made of composite materials such as glass reinforced plastics, with lengths sometimes above 50 meters, could benefit from more efficient manufacturing methods.

Automatic fiber placement machines are known in the field of composite materials as making the manufacturing more efficient. They involve moving a fiber placement head past a mould and depositing fiber tows on the mould, see e.g. U.S. Pat. No. 6,692,681 B1, US2007044896A1 or WO2005105641A2. Although such machines improve manufacturing efficiency compared to manual fiber placement methods, there is still room for improvements where more than one fiber material is used for the product produced in the mould.

SUMMARY

An aspect of the invention is to make manufacturing of composite wind turbine components, in particular wind turbine blades, more efficient.

Another aspect of the invention is to increase flexibility regarding choice and placement of materials of composite wind turbine components, in particular wind turbine blades.

A further aspect of the invention is to optimise the use of materials in manufacturing of composite wind turbine components, in particular wind turbine blades.

These aspects are reached with a method of forming a composite body using a mould and an automated fiber placement machine comprising a fiber placement head, the method comprising moving the fiber placement head past the mould and depositing on the mould a plurality of fiber tows each comprising fibers extending in the direction of movement of the fiber placement head, the fiber tows being deposited side by side in a direction perpendicular to the movement of the fiber placement head and perpendicular to the direction of a normal of a surface of the mould where the fiber tows are deposited, thus forming a ply with a plurality of fiber tows placed side by side on the mould, characterised in that the fiber tows in the ply comprise first and second fiber tows comprising respective first and second fiber materials, that are different from each other.

Thus, at least one of the fiber tows comprises fibers in a material other than the material of fibres in the remaining fiber tows in the ply. By providing, in a ply, fiber tows arranged side by side with fiber tows with other fiber materials, embodiments of the invention provide an effective manner of providing fiber plies with more than one fiber material, leaving a large degree of flexibility regarding the relationship between the placement of separate fiber types in each ply. In particular, where a certain amount of high performance fibers, such as carbon or graphite fibers, is called for in the composite body for strength and stiffness requirements, the method provides for mixing in a controlled manner in each ply the required amount of high performance fibers, with fibers having less performance, such as glass. Such optimisation in the use of materials avoids having to use more of the relatively expensive high performance fibers than what is called for by strength and stiffness requirements of the final product.

The fiber placement head could be provided in any suitable way known in fiber placement machine technology. For example, it could comprise one or more rollers around which fiber tows are stretched. As is also known, each fiber tow could be fed from a respective fiber tow reel mounted in the machine. Preferably, each fiber tow comprises fibers extending in the direction of movement of the fiber placement head. It is understood that each fiber tow has a band or tape like shape, so that it has a width which is substantially larger than its thickness. The fiber tows are placed flat on the mould so that their width is perpendicular to the direction of the normal of the mould surface. Fiber tows being placed side by side in a direction lateral to the movement of the fiber placement head and lateral to the thickness of the fiber tows, means that they are distributed along the width of the fiber placement head.

Preferably, at at least one location along the direction perpendicular to the movement of the fiber placement head and perpendicular to the direction of the normal of the surface of the mould where the fiber tows are deposited, one or more first fiber tows are interposed between two second fiber tows.

The method provides particular advantages where the composite body is a shell, a half shell, a spar cap or a spar web of a wind turbine blade. The large size of such blades raises issues of material flexibility and economy which will be addressed by use of the invention in the manner mentioned above.

Along with the fibers, at least one of the fiber tows, preferably all fiber tows, in the ply can comprise a matrix. The fibers in at least one of the fiber tows, preferably all fiber tows, in the ply can be pre-impregnated. This is in the art referred to as pre-preg, i.e., where the fiber tows comprise the matrix, or resin, which stabilize the fibers in the final composite structure.

Preferably the matrix is of the same substance for all fiber tows in the ply. Alternatively, the matrix in fiber tows with fibers in a certain material could be of a different substance than that of the matrix in fiber tows with fibers in another material.

In embodiments of the invention, the plurality of fiber tows in the ply are deposited simultaneously. As an alternative, the ply could be formed by moving the fiber placement head past the mould and depositing on the mould a first sub-set of the plurality of fiber tows, the first sub-set comprising at least one first fiber tow, and thereafter moving the fiber placement head past the mould and depositing on the mould a second sub-set of the plurality of fiber tows, the second sub-set comprising at least one second fiber tow. Preferably, the first sub-set comprises only first fiber tows, and the second sub-set comprises only second fiber tows. It should be noted that fiber tows of the_ second sub-set could be interposed between fiber tows of the first sub-set, and/or vice versa. Alternatively, all of the at least one fiber tow of the second sub-set could be placed on one side of all of the at least one fiber tow of the first sub-set.

Aspects of the invention are also reached with a composite body manufacturing arrangement.

BRIEF DESCRIPTION OF THE DRAWINGS

Below, embodiments of the invention will be described with reference to the drawings, in which.

DETAILED DESCRIPTION

Figure 1:
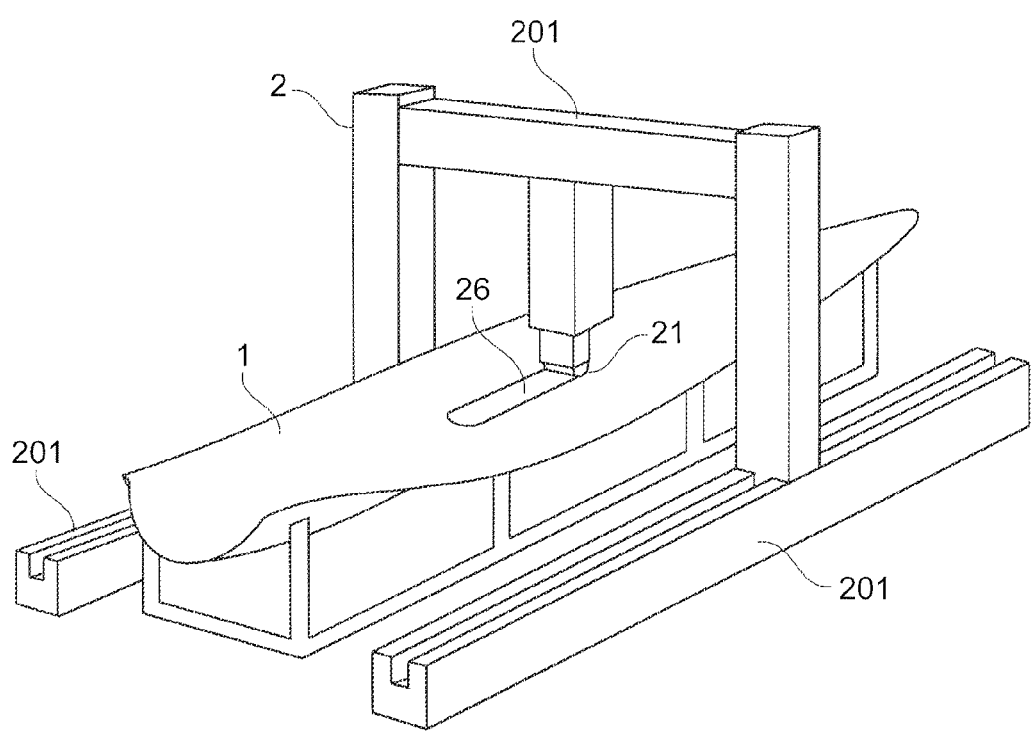
FIG. 1 shows a schematic perspective view of a composite body manufacturing arrangement.

FIG. 1 shows schematically a composite body manufacturing arrangement comprising a wind turbine blade shell mould 1 and an automated fiber placement machine 2. The wind turbine blade shell mould 1 is used to manufacture half shells for blades, which half shells are, after curing, joined with mating half shells to form the outer surface of the blades. It should be noted that the mould could be a mould for any part, such as a wind turbine blade spar cap, or a blade spar web. The machine 2 comprises a fiber placement head 21, which, by means of a guide arrangement 201 and other features known in the art, can be moved in any direction along the surface of the mould 1, and thereby place a ply 26 on the mould as detailed below.

Figure 2:
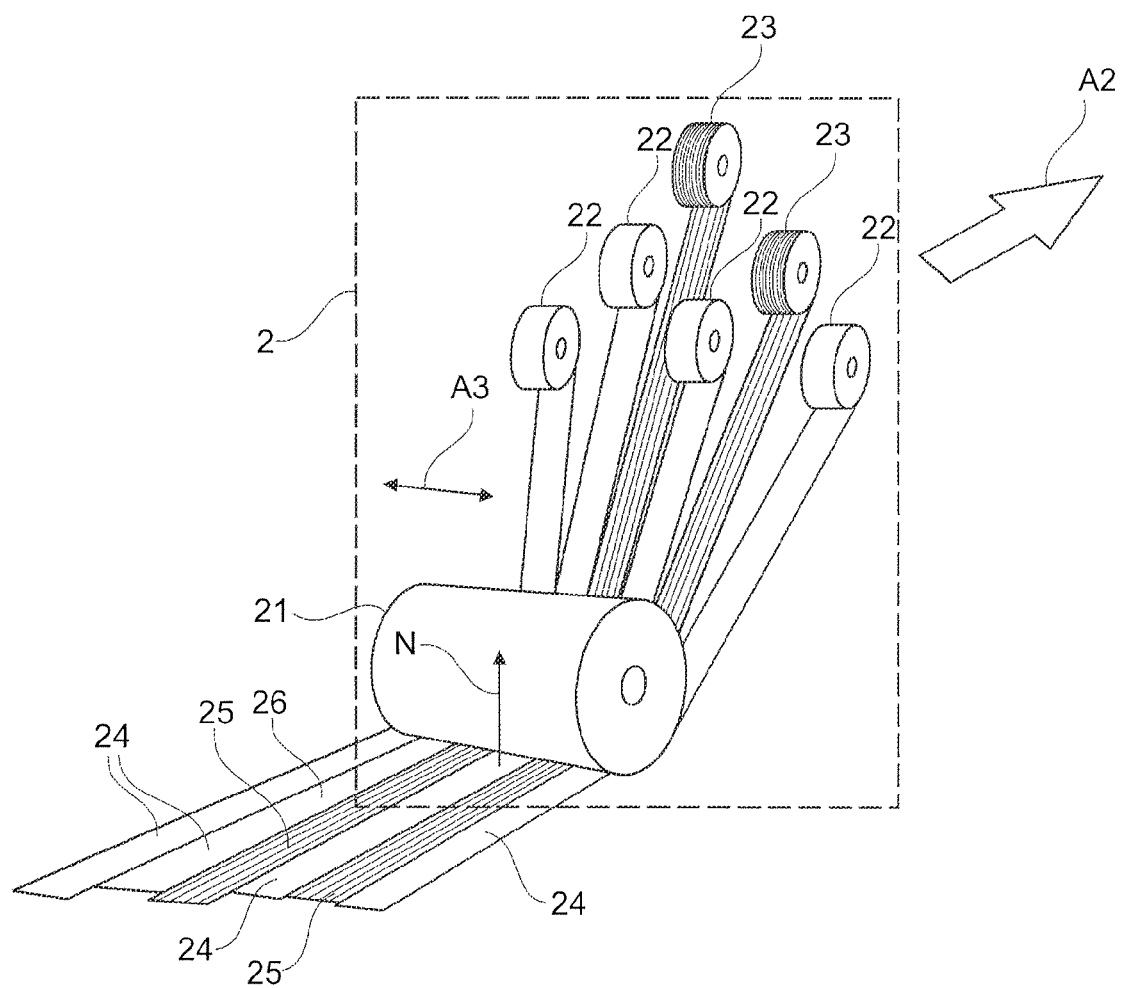
FIG. 2-FIG. 4 show schematic perspective views of parts of the arrangement in FIG. 1.

In FIG. 2, the automated fiber placement machine 2 is represented with a rectangle of broken lines 2 enclosing certain machine parts described here below. The fiber placement head 21 comprises a roller 21. A plurality of reels 22, 23 is provided in the machine 2, each with a respective fiber tow 24, 25 of pre-impregnated fibers. More specifically, each fiber tow 24, 25 comprises fibers extending in the longitudinal direction of the fiber tow, and is pre-impregnated with a matrix. In this example, the same matrix is used in all fiber tows.

The automated fiber placement machine 2 is adapted to be moved in a direction indicated by the arrow A2 in FIG. 2. The fiber placement head 21 is adapted to be forced, while moving, to the mould 1, and to guide the fiber tows 24, 25 fed from the reels 22, 23 underneath it so that the fiber tows are pressed towards the mould and laid side by side on the mould, extending in the direction of movement A2 of the fiber placement head 21. The fiber tows 24, 25 are deposited side by side in a direction, (indicated with a double arrow A3), perpendicular to the movement A2 of the fiber placement head 21 and perpendicular to the direction of a normal N of the mould surface where the fiber tows 24, 25 are deposited, thus forming the ply 26 with a plurality of fiber tows 24, 25 placed side by side on the mould 1. As is understood, while being deposited on the mould 1 in this manner, the fiber tows 24, 25 can either be laid directly onto the mould surface or onto plies that have already been deposited on the mould 1. As is known in the art, a heater (not shown) can be provided at the fiber placement head 21 to heat the matrix of the fiber tows 24, 25 so as to make the fiber tows stick when deposited.

The fiber tows comprise first fiber tows 24, and second fiber tows 25, comprising a first fiber material and a second fiber material, respectively. As an example, the first fiber material could be glass, and the second fiber material could be carbon, although different combinations of fiber materials are possible, such as glass and aramid (e.g. Kevlar®), or carbon and aramid. The first and second fiber tows are interleaved in the direction A3 perpendicular to the movement A2 of the fiber placement head 21, so that along the width (direction A3) of the ply 26, second fiber tows 25 are interposed between first fiber tows 24. For example, at at least one location along the width of the ply 26, one or more second fiber tows 25 can be interposed between two first fiber tows 24, and/or one or more first fiber tows 24 can be interposed between two second fiber tows 25. Alternatively, all of the first fiber tows could be placed on one side of all of the second fiber tows.

In FIG. 2, six fiber tows are shown, but alternatively, more or less fiber tows can be involved when practicing the invention. For example, the number of fiber tows could be sixteen, twenty-four or thirty-two.

Figure 3:
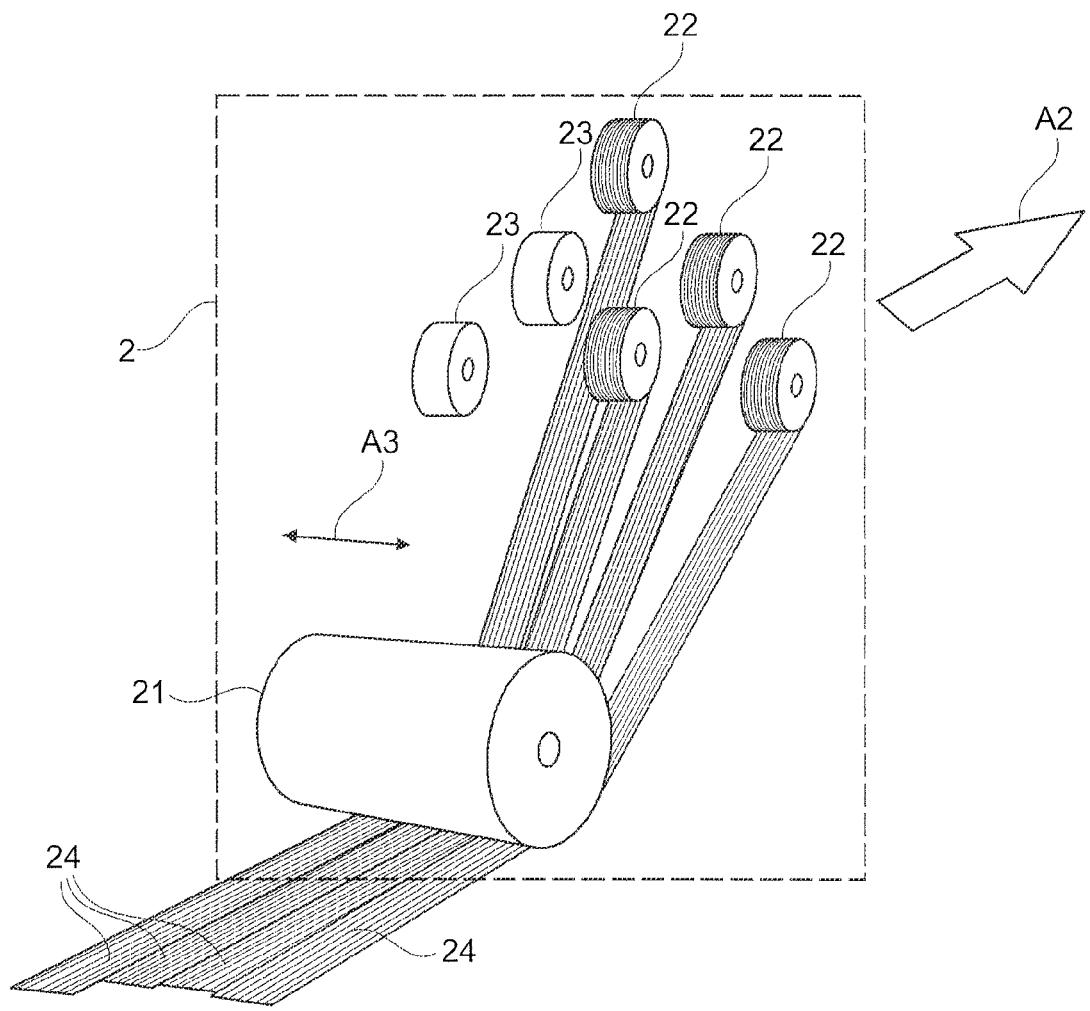
Figure 4:
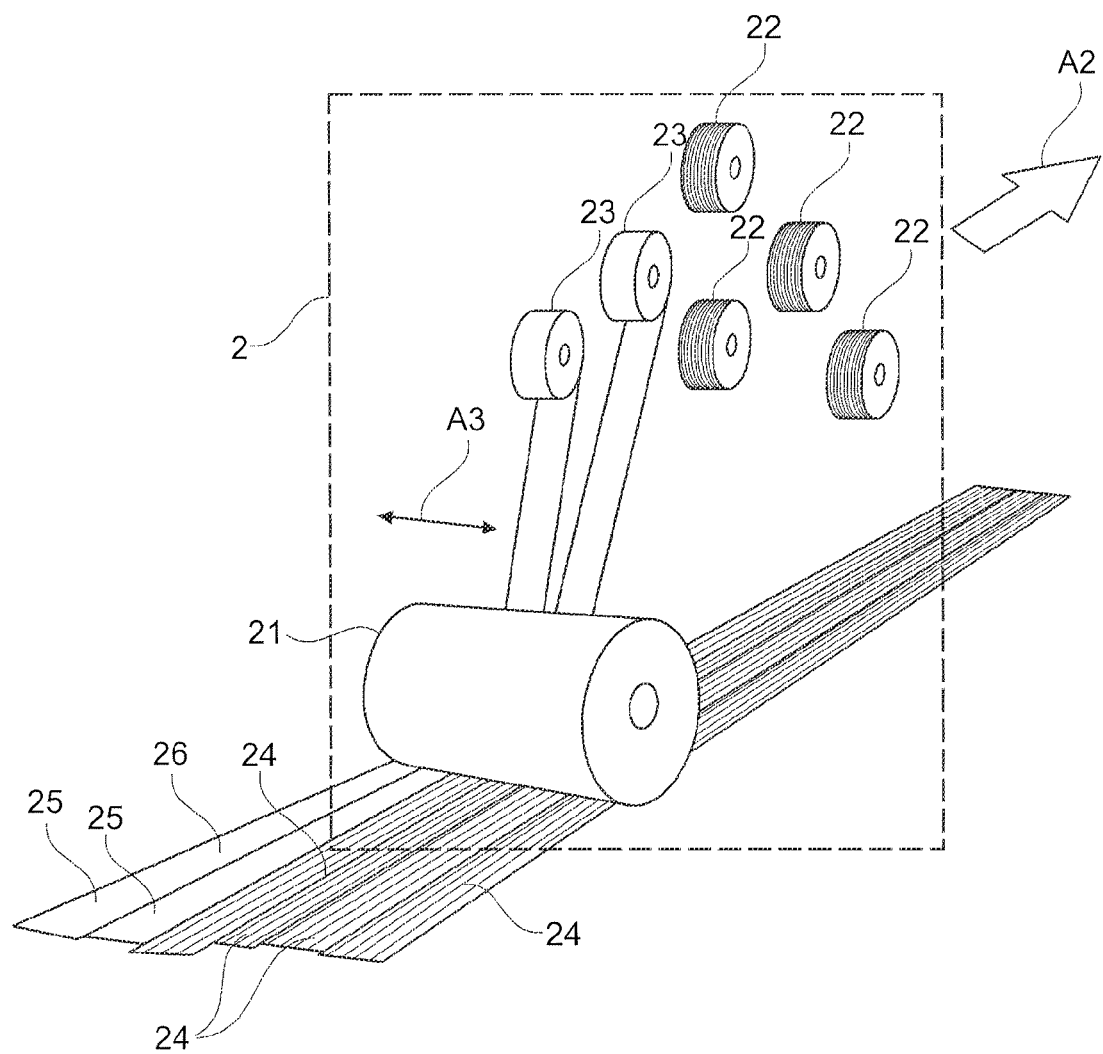

Reference is made to FIG. 3 and FIG. 4. In an alternative embodiment, in a first step of forming a ply 26, the fiber placement head 21 is moved past the mould and a first sub-set of fiber tows 24 is deposited, see FIG. 3. The first sub-set comprises first fiber tows 24, with for example carbon fibers. In a second step, the fiber placement head 21 is moved past the mould along the same path as in the first step, and a second sub-set of fiber tows is deposited, see FIG. 4. The second sub-set comprises second fiber tows 25, with for example glass fibers. In this example, all of the second fiber tows 25 are placed on one side of all of the first fiber tows 24. Alternatively, fiber tows 25 of the second sub-set could be interposed between fiber tows 24 of the first sub-set, and/or vice versa.

The invention claimed is:

1. A method of forming a composite body using a mould and an automated fiber placement machine comprising a single fiber placement head fed fiber tows from a plurality of different reels, the method comprising:

moving the single fiber placement head past the mould; and depositing on the mould a plurality of fiber tows, each fiber tow including multiple fibers, the fiber tows being deposited side by side in a direction perpendicular to the movement of the single fiber placement head and perpendicular to the direction of a normal of a surface of the mould where the fiber tows are deposited, thus forming a single ply with a plurality of fiber tows placed side by side on the mould, wherein the fiber tows in the single ply comprise first and second fiber tows fed from different reels to the single fiber placement head, the fibers in the first fiber tows including different materials than the fibers in the second fiber tows, wherein the composite body is a shell, a half shell, a spar cap or a spar web of a wind turbine blade, and wherein the plurality of fiber tows is deposited simultaneously in an abutting relation to one another by the single fiber placement head such that the different materials of the first fiber tows and the second fiber tows are not combined in abutting relation until the single fiber placement head deposits the fiber tows on the mould.

2. The method according to claim 1, wherein at least one location along the direction perpendicular to the movement of the fiber placement head and perpendicular to the direction of the normal of the surface of the mould where the fiber tows are deposited, one or more first fiber tows are interposed between two second fiber tows.

3. The method according to claim 1, wherein the fibers in at least one of the fiber tows in the ply is pre-impregnated with a matrix.

4. The method according to claim 3, wherein the matrix is of the same substance for all fiber tows in the ply.

5. A method of forming a composite body using a mould and an automated fiber placement machine comprising a single fiber placement head fed fiber tows from a plurality of different reels, the method comprising:

moving the single fiber placement head past the mould;

depositing on the mould with the single fiber placement head a first sub-set of fiber tows fed from different reels and consisting of at least one first fiber tow;

depositing on the mould with the single fiber placement head a second sub-set of fiber tows fed from different reels and consisting of at least one second fiber tow; and combining the first sub-set of fiber tows and the second sub-set of fiber tows on the mould into a single ply in which first fiber tows and second fiber tows are deposited side by side in abutting relation in a direction perpendicular to the movement of the fiber placement head and perpendicular to the direction of a normal of a surface of the mould, wherein each first fiber tow includes different fiber materials than fiber materials in each second fiber tow, wherein the composite body is a shell, a half shell, a spar cap or a spar web of a wind turbine blade, and wherein the different fiber materials of the first fiber tows and the second fiber tows are not combined in abutting relation until the single fiber placement head deposits the second fiber tows on the mould.

6. The method according to claim 5, wherein each fiber tow includes multiple fibers pre-impregnated with a matrix.

7. The method according to claim 6, wherein the matrix is of the same substance for all fiber tows in the single ply.

\* \* \* \* \*